(12) United States Patent
Kim et al.

(10) Patent No.: US 10,720,679 B2
(45) Date of Patent: Jul. 21, 2020

(54) COOLING CASE FOR BATTERY AND BATTERY MODULE INCLUDING THE SAME

(71) Applicant: SK INNOVATION CO., LTD., Seoul (KR)

(72) Inventors: Tae Il Kim, Daejeon (KR); Sung Yeop Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/989,876

(22) Filed: May 25, 2018

(65) Prior Publication Data

US 2018/0358665 A1 Dec. 13, 2018

(30) Foreign Application Priority Data

Jun. 13, 2017 (KR) .................. 10-2017-0074234
Apr. 10, 2018 (KR) .................. 10-2018-0041658

(51) Int. Cl.

| | | |
|---|---|---|
| *H01M 10/613* | (2014.01) | |
| *H01M 2/10* | (2006.01) | |
| *H01M 10/6554* | (2014.01) | |
| *H01M 10/6562* | (2014.01) | |
| *H01M 10/6555* | (2014.01) | |

(52) U.S. Cl.
CPC ........... *H01M 10/613* (2015.04); *H01M 2/10* (2013.01); *H01M 2/1072* (2013.01); *H01M 10/6554* (2015.04); *H01M 10/6562* (2015.04); *H01M 10/6555* (2015.04)

(58) Field of Classification Search
CPC ........... H01M 10/613; H01M 10/6554; H01M 2/1072; H01M 10/6562; H01M 2/10; H01M 10/6555
USPC ........................................................ 429/120
See application file for complete search history.

(56) References Cited

U.S. PATENT DOCUMENTS

2011/0189521 A1* 8/2011 Lee .................. H01M 2/1077
429/120
2018/0219265 A1* 8/2018 Osio .................. H01M 10/625

FOREIGN PATENT DOCUMENTS

| KR | 1020130011370 | 1/2013 |
|---|---|---|
| KR | 10-2016-0071109 A | 6/2016 |
| KR | 10-2016-0078035 A | 7/2016 |
| KR | 10-2016-0108960 A | 9/2016 |

\* cited by examiner

*Primary Examiner* — Gary D Harris
(74) *Attorney, Agent, or Firm* — IP & T Group LLP (57) ABSTRACT

According to an embodiment of the present invention, there is provided a cooling case for a battery which includes a first case and a second case, and a space in which one or more of battery cells are housed, the first case including: a first coupling part configured to be coupled with the second case; and a first opening part opened therein so that one sides of battery cells housed in the cooling case are exposed to an outside, so as to cool the battery cells by a cooling member.

15 Claims, 5 Drawing Sheets

COOLING CASE FOR BATTERY AND BATTERY MODULE INCLUDING THE SAME

CROSS-REFERENCE TO RELATED APPLICATION

This application claims priority to and the benefit of Korean Patent Application No. 10-2017-0074234, filed on Jun. 13, 2017, Korean Patent Application No. 10-2018-0041658, filed on Apr. 10, 2018, the disclosures of which are incorporated herein by reference in their entirety.

BACKGROUND OF THE INVENTION

1. Field of the Invention

The present invention relates to a cooling case for a battery and a battery module including the same.

2. Description of the Related Art

Generally, a pouch type battery has a thin plate-shaped structure, and is used as a module by combining a plurality of cells into one unit. The modules are connected to each other in series to form a package. When charging or discharging the battery module package having the connected modules in series, there is a phenomenon in which the battery cells generate heat. A temperature of each battery cell may be different for each unit cell depending on cooling characteristics, and charging and discharging powers may vary depending on the temperature of the battery cells. However, the battery cells should be operated at an appropriate operating temperature, for example, in a range of 25 to 40 degrees. In a battery pack, only a temperature distribution of battery cells on a side closer to a cooling means is formed close to the minimum temperature of the above-described range, while the temperature distribution of battery cells far away from the cooling means is formed above the above-described range, thereby resulting in a decrease in cooling efficiency. In particular, in a case of the cooling means is a fan, such a tendency may become more serious.

To improve this problem, conventionally, gradients are applied to an incidence angle and a top cover of an intake duct, respectively, for achieving a uniform cooling flow distribution across the entire battery cells. However, if increasing the number of the battery cells or changing a position of the intake port in the above-described method, a deviation in the temperature may be further increased, such that there is a problem that the initial design of the battery cell should be reconsidered.

For example, Korean Patent Laid-Open Publication No. 10-2013-0011370 discloses a cooling case for a battery pack, however, still has lack of improvement in the temperature distribution of the battery cells.

SUMMARY OF THE INVENTION

An object of the present invention is to provide to a cooling case for a battery which enables heat exchange through convection or conduction by exposing one or more sides of stacked battery cells.

In addition, another object of the present invention is to provide a battery module including a cooling case for a battery which enables heat exchange through convection or conduction by exposing one or more sides of stacked battery cells.

Further, another object of the present invention is to provide a cooling case for a battery in which stacked battery cells are formed to correspond to a cooling member, so that an area thereof exposed to an outside may be arranged so as to contact the cooling member or be spaced apart therefrom at a predetermined interval.

Further, another object of the present invention is to provide a battery module including a cooling case for a battery in which stacked battery cells are formed to correspond to a cooling member, so that an area thereof exposed to an outside may be arranged so as to contact the cooling member or be spaced apart therefrom at a predetermined interval.

Furthermore, another object of the present invention is to provide a cooling case for a battery in which a height of a surface of a case in which the battery cells are mounted is determined by the battery cells housed therein, such that a distance between the battery cells that generate heat and the cooling member may be determined.

Furthermore, another object of the present invention is to provide a battery module including a cooling case for a battery in which a height of a surface of a case in which the battery cells are mounted is determined by the battery cells housed therein, such that a distance between the battery cells that generate heat and the cooling member may be determined.

To achieve the above-described objects, according to an aspect of the present invention, there is provided a cooling case for a battery which includes a first case and a second case, and a space in which one or more of battery cells are housed, the first case including: a first coupling part configured to be coupled with the second case; and a first opening part opened therein so that one sides of battery cells housed in the cooling case are exposed to an outside, so as to cool the battery cells by a cooling member.

In addition, the second case may include: a second coupling part configured to be coupled with the first case; and a second opening part opened therein so that one sides of the battery cells housed in the cooling case are exposed to the outside, so as to cool the battery cells by the cooling member.

Further, the second case may be formed to be symmetrical with the first case so as to be coupled with each other.

Further, the battery cells may be cooled by the cooling member in any one method of cooling in which the battery cells are cooled by convection with being spaced apart from the cooling member, and cooling in which the battery cells are cooled by conduction with being in contact with the cooling member.

Further, the opening parts including the first opening part and the second opening part may be positioned between a plurality of coupling parts including the first coupling part and the second coupling part.

Further, mounting surfaces, on which the battery cells are mounted in the cases, are respectively positioned inside the coupling parts, and are formed so that the battery cells are exposed to an outside in a section of a protrusion length or less, in which the coupling parts protrude from the bodies.

According to another aspect of the present invention, there is provided a battery module including: at least one of battery cells; and a cooling case which houses the battery cells and includes a first case and a second case, wherein the first case includes: a first coupling part configured to be coupled with the second case; and a first opening part opened therein so that one sides of battery cells are exposed from an outside of the case, so as to cool the battery cells by a cooling member.

In addition, the second case may include: a second coupling part configured to be coupled with the first case; and a second opening part opened therein so that one sides of battery cells are exposed from the outside of the case, so as to cool the battery cells by the cooling member.

Further, the battery cell may include sealing parts and an adhesion part formed on outer circumferences thereof by an exterior material, the sealing parts may be formed on three sides of four outer circumferences of the battery cell, and the adhesion part may be formed on the remaining one side of the battery cell.

Further, the adhesion part may be exposed to an outside of the cases through the opening parts including the first opening part and the second opening part.

According to an embodiment of the present invention, it is possible to provide a cooling case for a battery which enables heat exchange through convection or conduction by exposing one or more sides of stacked battery cells.

In addition, according to the embodiment of the present invention, it is possible to provide a battery module including a cooling case for a battery which enables heat exchange through convection or conduction by exposing one or more sides of stacked battery cells.

Further, according to the embodiment of the present invention, it is possible to provide a cooling case for a battery in which stacked battery cells are formed to correspond to a cooling member, so that an area thereof exposed to an outside may be arranged so as to contact the cooling member or be spaced apart therefrom at a predetermined interval.

Further, according to the embodiment of the present invention, it is possible to provide a battery module including a cooling case for a battery in which stacked battery cells are formed to correspond to a cooling member, so that an area thereof exposed to an outside may be arranged so as to contact the cooling member or be spaced apart therefrom at a predetermined interval.

Furthermore, according to the embodiment of the present invention, it is possible to provide a cooling case for a battery in which a height of a surface of a case in which the battery cells are mounted is determined by the battery cells housed therein, such that a distance between the battery cells that generate heat and the cooling member may be determined.

Furthermore, according to the embodiment of the present invention, it is possible to provide a battery module including a cooling case for a battery in which a height of a surface of a case in which the battery cells are mounted is determined by the battery cells housed therein, such that a distance between the battery cells that generate heat and the cooling member may be determined.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferable embodiments of the present invention will be described with reference to the accompanying drawings, which illustrate a preferred embodiment of the present invention without particular limitation thereof.

In description of the present invention, the publicly known functions and configurations that are judged to be able to make the purport of the present invention unnecessarily obscure will not be described in detail. In addition, tams or words used in the specification and claims should not be construed as limited to a lexical meaning, and should be understood as appropriate notions by the inventor based on that he/she is able to define teams to describe his/her invention in the best way to be seen by others.

However, those skilled in the art will appreciate that such embodiments are provided for illustrative purposes and do not limit subject matters to be protected as disclosed in the detailed description and appended claims. Therefore, it will be apparent to those skilled in the art that various alterations and modifications of the embodiments are possible within the scope and spirit of the present invention and duly included within the range as defined by the appended claims.

Figure 1:
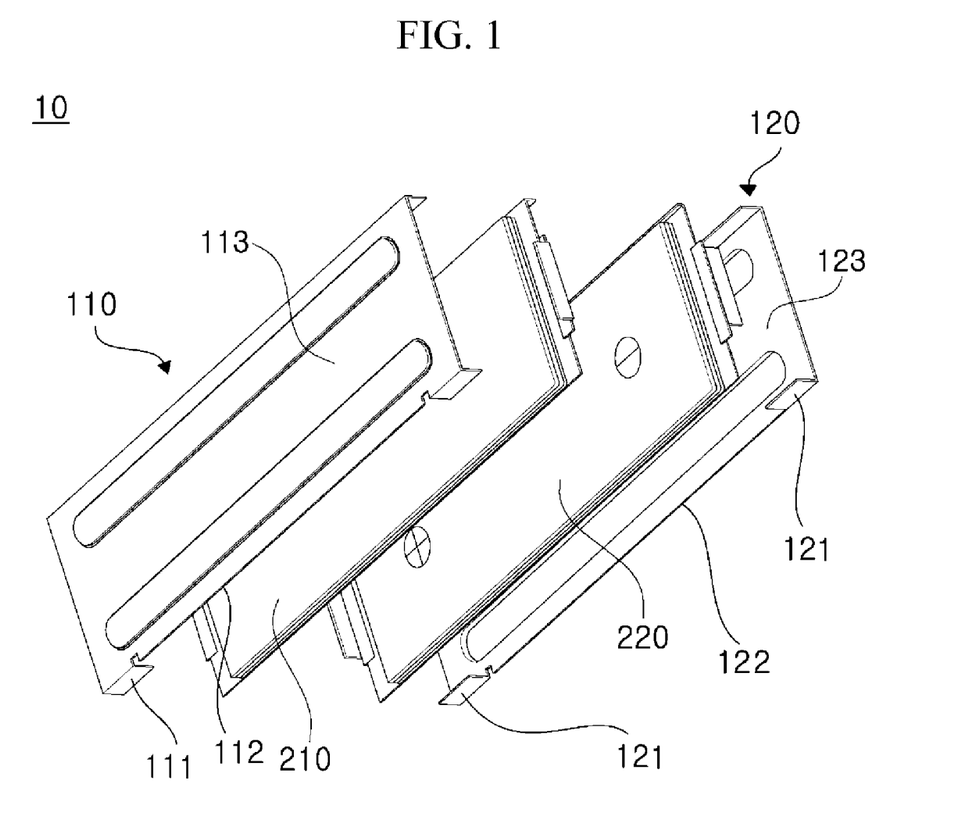
FIG. 1 is an exploded perspective view of a battery module according to an embodiment of the present invention.

FIG. 1 is an exploded perspective view of a battery module 10 according to an embodiment of the present invention.

Referring to FIG. 1, the battery module 10 may include: cases 110 and 120 (hereinafter, also collectively referred to as a "cooling case 100" or respectively referred to as "cases 100 (110 and 120)"); and first and second battery cells 210 and 220 (hereinafter, also collectively referred to as a "battery cell 200" or respectively referred to as "battery cells 200 (210 and 220)").

The cooling case 100 may include a first case 110 and a second case 120. Herein, as illustrated in FIG. 1, the first case 110 and the second case 120 may be formed in a symmetrical form with each other, but these cases may be formed in any form regardless of whether specific forms are identical to each other or not, so long as they can house the battery cells 200 (210 and 220). However, this corresponds to a case in which each case 100 (110 or 120) includes coupling parts 111 and 121 of FIG. 2, and opening parts 112 and 122 of FIG. 2, which will be described below. In addition, for the purpose of explaining the present invention, an example, in which the cases 100 (110 and 120) are symmetric with each other, will be described below.

In the example illustrated in FIG. 1, the cases 100 (110 and 120) may have four coupling parts 111 and 121 formed in each case (110 or 120), and first and second opening parts 112 and 122 formed therein on a side of the battery cells 200 (210 and 220), so as to expose electrode tabs and the sides of the battery cells 200 (210 and 220) to an outside. Accordingly, when the respective coupling parts 111 and 121 are coupled with each other, an inside of the cooling case 100 is exposed to the outside while the respective opening parts 112 and 122 face each other. In other words, the battery cell 200 housed in the cooling case 100 may be exposed to the outside due to the opening parts 112 and 122. Specifically, the above-described cases 100 (110 and 120) may include: the first case 110 having a first body 113 and a plurality of first coupling parts 111 protruding from the first body 113; and the second case 120 having a second body 123 and a plurality of second coupling parts 121 protruding from the second body 123.

Figure 2:
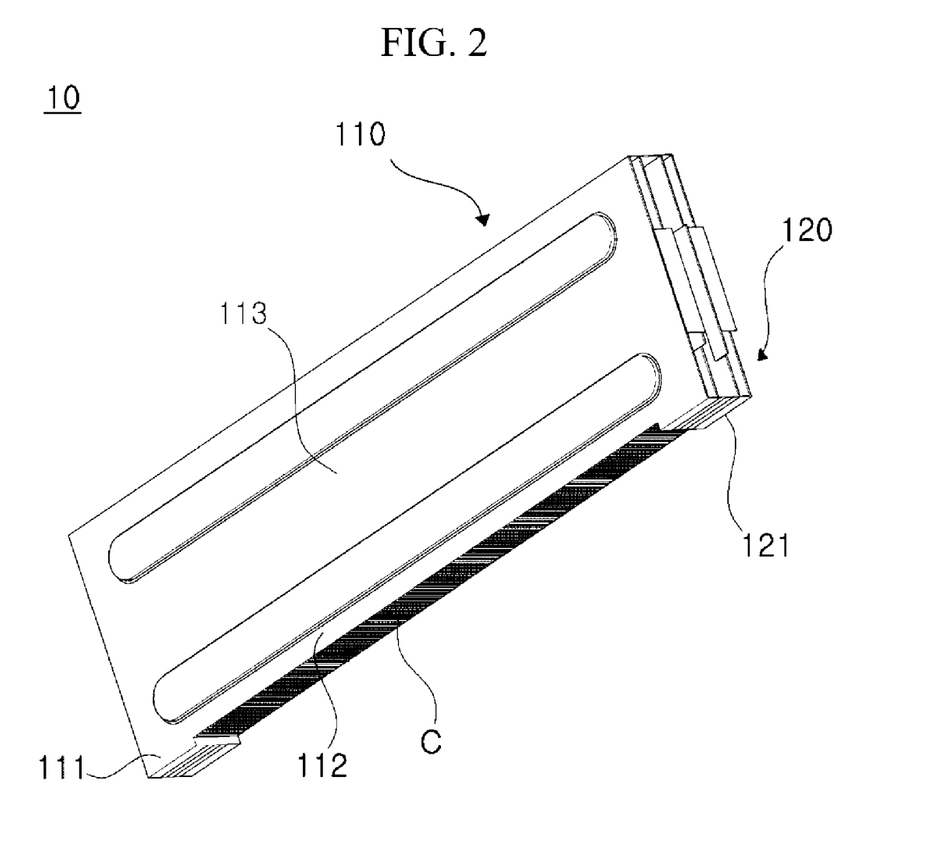
FIG. 2 is an assembled perspective view of the battery module according to the embodiment of the present invention.

FIG. 2 is an assembled perspective view of the battery module 10 according to the embodiment of the present invention.

Referring to FIG. 2, the assembled battery module 10 may have an exposed surface C defined by exposing the battery cells 200 (210 and 220) positioned in the cases 100 (110 and 120) to the outside. In order to prevent the battery cell 200 from being expanded or exploded by heat generated therein, the exposed surface C is defined in an area capable of directly cooling the battery cell 200 through convection or conduction, which may reduce a temperature of the battery cell 200.

For example, the battery cells 200 (210 and 220) may be cooled by directly contacting a cooling member 20 (FIG. 3), or by air cooling by a fan (not illustrated), which will be described in detail with reference to FIG. 3.

Figure 3:
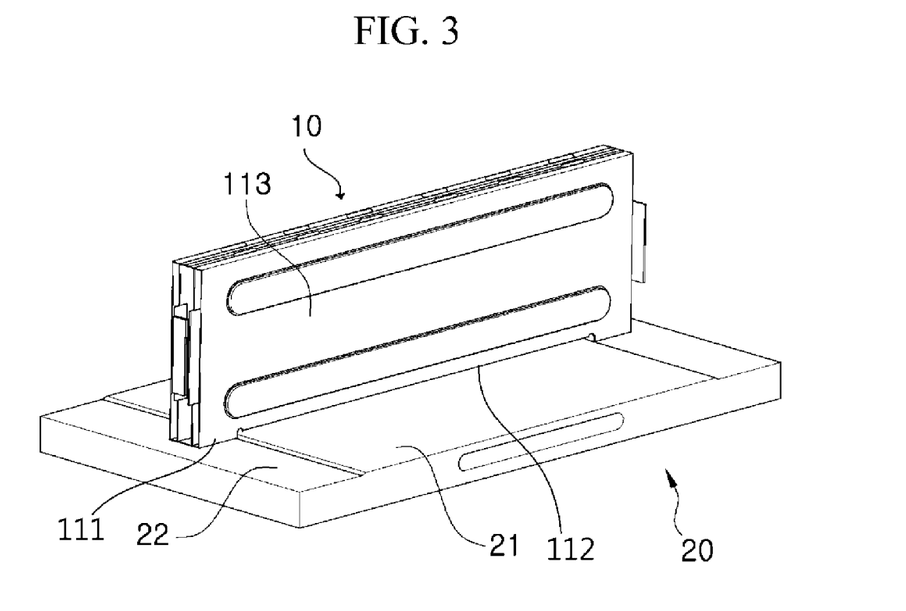
FIG. 3 is a perspective view illustrating a state in which the battery module according to the embodiment of the present invention is mounted on a cooling member.

FIG. 3 is a perspective view illustrating a state in which the battery module 10 according to the embodiment of the present invention is mounted on the cooling member 20.

Referring to FIG. 3, the battery module 10 may directly contact the cooling member 20 through the exposed surface C defined by the opening parts 112 and 122 formed therein, thus to be cooled. A form of the cooling member 20 is not limited to the example illustrated in FIG. 3, but there may be a form in which the cooling member is formed so as to correspond to the cases 100 (110 and 120) of the battery module 10.

According to the present embodiment, the cooling member 20 may include protrusion parts 21 and a support surface 22. Herein, the protrusion parts 21 may be formed so as to correspond to the opening parts 112 and 122 formed in the cases 100 (110 and 120). For example, in a case of a multi-end type in which the opening parts 112 and 122 are formed inside from the coupling parts 111 and 121, a protrusion length of the protrusion part 21 may be determined so as to correspond to a height difference of the multi ends. Of course, the protrusion part 21 may have a width correspond to a length of the opening parts 112 and 122 formed in the cases 110 and 120 (hereinafter, also referred to as a "formed length"), but may be formed in the formed length of the opening parts 112 and 122 or less.

For example, when the protrusion part 21 of the cooling member 20 has a width shorter than the length of the opening parts 112 and 122, a portion of the battery cell 200 which contacts the protrusion part 21 of the cooling member 20 may be cooled through the exposed surface C defined by the opening parts 112 and 122 across the length of the protrusion part 21 by conduction, while the other portions of the battery cell 200 which do not contact the protrusion part 21 of the cooling member 20 may be cooled through the exposed surface C by air cooling. Accordingly, a type and a shape of the cooling member 20 may be selected depending on conditions of the opening parts 112 and 122.

Figure 4A:
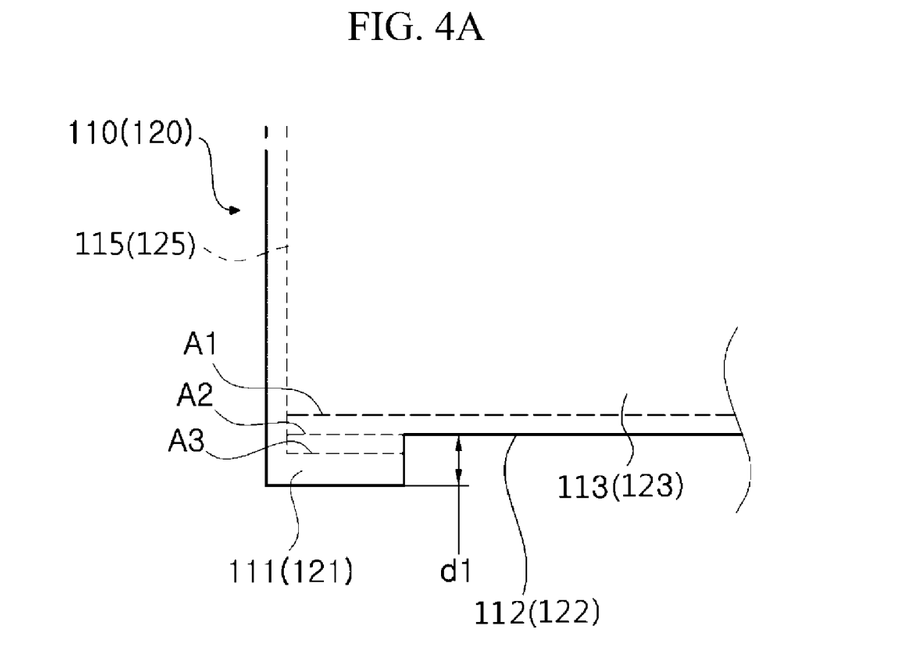
FIG. 4A is a diagram illustrating a first step formed in a case and mounting positions of a battery cell according to the embodiment of the present invention.
Figure 4B:
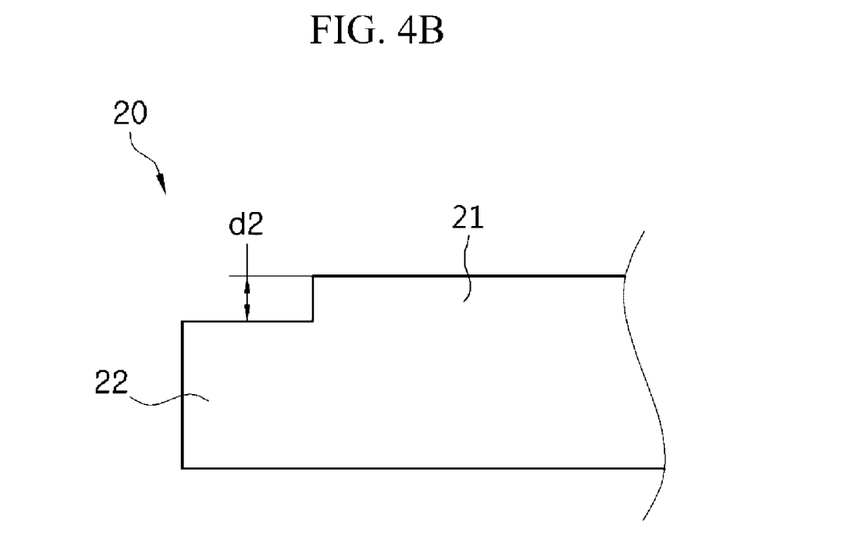
FIG. 4B is a diagram illustrating the cooling member formed so as to correspond to the battery module according to the embodiment of the present invention.

FIG. 4 is diagrams illustrating mounting surface of the battery module 10 and the cooling member 20 according to the embodiment of the present invention, wherein FIG. 4A is a diagram illustrating a first step d1 formed in the cases 100 (110 and 120) and first to third mounting positions A1, A2 and A3 of the battery cell 200 according to the embodiment of the present invention, and FIG. 4B is a diagram illustrating the cooling member 20 formed so as to correspond to the battery module 10 according to the embodiment of the present invention.

Referring to FIGS. 4A and 4B, the first step d1 may be formed between the coupling parts 111 and 121 and the opening parts 112 and 122 in the cases 100 (110 and 120), which is a distance difference therebetween. The battery module 10 may contact the cooling member 20 through a space provided by the first step d1 at the time of installation thereof. The first step d1 may also serve as a structure formed to increase a coupling force with the cooling member 20 during coupling the battery module 10.

Of course, as described above, the opening parts 112 and 122 may be formed for cooling in order to decrease the temperature of the battery cell 200 that generates heat, and in this case, it is advantageous that the protrusion part 21 of the cooling member 20 and the exposed surface C of the battery cell 200 are disposed closer to each other. For example, the battery cell 200 may contact the protrusion part 21 through the exposed surface C to facilitate heat exchange therebetween through the conduction, thus to decrease the temperature of the battery cell 200.

However, when the protrusion part 21 and the exposed surface C are spaced apart from each other at a constant distance, the battery cell 200 may be cooled by providing a fan, or the like, through convection. When the battery cell 200 does not include the cooling member 20, the same cooling method as the above may be employed.

Meanwhile, the cases 100 (110 and 120) may have mounting surfaces 115 and 125 for mounting the battery cell 200 formed inside the coupling parts 111 and 121 thereof. Forming positions (heights) of the mounting surfaces 115 and 125 may be selectively determined. For example, the mounting positions in which the mounting surfaces 115 and 125 are formed may be the third and first mounting positions A1 and A3 respectively positioned outside or inside of the cooling case 100 based on the opening parts 112 and 122, and also may be the second mounting position A2 positioned at a height on the same line as the opening parts 112 and 122.

Herein, when the first mounting position A1 is formed in the cases 100 (110 and 120), the battery cell 200 cannot contact the protrusion part 21 of the cooling member 20. Thereby, in order to cool the battery cell 200 through the conduction, the cooling member 20 may have a form in which the protrusion part 21 thereof is inserted into the opening parts 112 and 122 to come in contact the exposed surface C.

In addition, when the second mounting position A2 is formed in the cases 100 (110 and 120), the battery cell 200 may contact the protrusion part 21 of the cooling member 20, thus to be cooled by the conduction.

Further, when the third mounting position A3 is formed in the cases 100 (110 and 120), the battery cell 200 may contact the protrusion part 21 of the cooling member 20. However, in this case, when a second step d2 which is a height difference between the support surface 22 and the protrusion part 21 formed in the cooling member 20 is lower than the first step d1, a direct contact between the battery cell 200 and the protrusion part 21 of the cooling member 20 may not be accomplished. Accordingly, in order to cool the battery cell 200 by the conduction when determining the third mounting position A3 as a mounting position, a condition, in which the second step d2 is formed in a vertical distance between the coupling parts 111 and 121 and the third mounting position A3 or more, may be required.

Figure 5A:
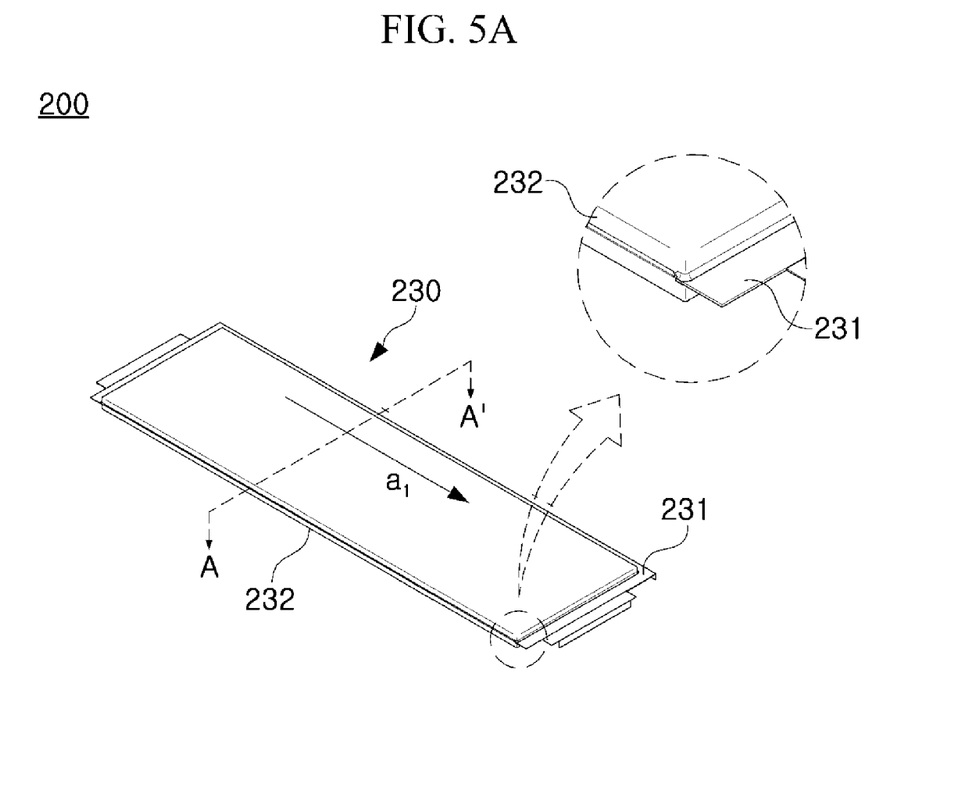
FIG. 5A is view illustrating a specific shape of the battery cell included in the battery module according to the embodiment of the present invention.
Figure 5B:
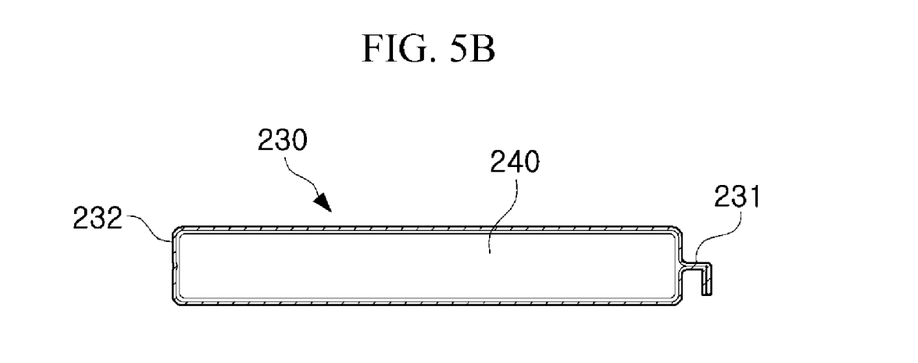
FIG. 5B is a cross-sectional view taken along line A-A' of FIG. 5A.

FIG. 5A is view illustrating a specific shape of the battery cell 200 included in the battery module 10 according to the embodiment of the present invention, and FIG. 5B is a cross-sectional view taken along line A-A' of FIG. 5A.

Referring to FIGS. 5A and 5B, one side of the battery cell 200 housed in the battery module 10 according to the embodiment of the present invention, that is, one side except sealing parts 231 on three sides, which are formed by adhering an exterior material 230 to outer circumferences of the battery cell 200 in a lengthwise direction a1, may be an adhesion part 232 formed by adhering the exterior material 230 to an electrode assembly 240.

Specifically, one side of the above-described battery cell 200 may be formed as the adhesion part 232 in contact the electrode assembly 240 in a state in which the exterior material 230 is not sealed, and the adhesion part 232 side of the battery cell 200 may be exposed to the outside through the opening parts 112 and 122 of the cases 100 (110 and 120) to define the exposed surface C.

Therefore, when the adhesion part 232 of the battery cell 200 contacts the protrusion part 21 of the cooling member 20, these parts contact with each other in a plane contact manner, such that a contact area between the cooling member 20 and the battery cell 200 may be increased, thereby largely increasing heat transfer efficiency.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

DESCRIPTION OF REFERENCE NUMERALS

10: battery module
20: cooling member
21: protrusion part
22: support surface
100: cooling case
110: first case
111: first coupling part
112: first opening part
113: first body
115: mounting surface
120: second case
121: second coupling part
122: second opening part
123: second body
125: mounting surface
200: battery cell
210: first battery cell
220: second battery cell
230: exterior material
231: sealing part
232: adhesion part
240: electrode assembly
a1: lengthwise direction of battery cell
C: exposed surface
d1: first step
d2: second step
A1: first mounting position
A2: second mounting position

What is claimed is:

1. A cooling case for a battery comprising:
   a first case including a first body, a plurality of first coupling parts protruding from the first body, and a first opening part stepped from the first coupling parts; and
   a second case which is coupled with the first case through the first coupling parts, and includes a second body, a plurality of second coupling parts which protrude from the second body and are positioned at positions corresponding to the first coupling parts, and a second opening part stepped from the second coupling parts, the second case being coupled to the first case to form an accommodation space in which battery cells are accommodated;
   wherein the battery cells are exposed to an outside of the cooling case through the respective first and second opening parts of the first and second cases, thereby being cooled by a cooling member positioned outside the cooling case.

2. The cooling case for a battery according to claim 1, wherein the second case and the first case are symmetrical with each other.

3. The cooling case for a battery according to claim 1, wherein the battery cells are spaced apart from the cooling member and are cooled by the cooling member by convection.

4. The cooling case for a battery according to claim 1, wherein the opening parts including the first opening part and the second opening part are positioned between a plurality of coupling parts including the first coupling part and the second coupling part.

5. The cooling case for a battery according to claim 4, wherein mounting surfaces, on which the battery cells are mounted in the first and second cases, are respectively positioned inside the coupling parts, and are formed so that the battery cells are exposed to an outside in a section of a protrusion length or less, in which the coupling parts protrude from the bodies.

6. A battery module comprising:
   at least one of battery cells;
   a first case including a first body, a plurality of first coupling parts protruding from the first body, and a first opening part stepped from the first coupling parts; and
   a second case which is coupled with the first case through the first coupling parts, and includes a second body, a plurality of second coupling parts which protrude from the second body and are positioned at positions corresponding to the first coupling parts, and a second opening part stepped from the second coupling parts, the second case being coupled to the first case to form an accommodation space in which battery cells are accommodated;
   wherein the battery cells are exposed to an outside of the first and second cases through the respective first and second opening parts, thereby being cooled by a cooling member positioned outside the first and second cases.

7. The battery module according to claim 6, wherein each of the battery cells includes sealing parts and an adhesion part formed by an exterior material, wherein the sealing parts are formed on three sides of four outer sides of the circumference of each of the battery cells, and the adhesion part is formed on the remaining one side of the four sides of the circumference of the battery cell.

8. The battery module according to claim 7, wherein the adhesion part is exposed to an outside of the first and second cases through the opening parts including the first opening part and the second opening part.

9. The cooling case for a battery according to claim 1, wherein the battery cells are in direct contact with the cooling member and are cooled by conduction.

10. A cooling case for a battery module, the cooling case comprising:
   a first and a second case coupled together using a plurality of coupling parts to form the cooling case in which a plurality of battery cells are housed; and
   an opening formed by the first and second cases and stepped from the plurality of coupling parts,
   wherein the battery cells are exposed through the opening to a cooling member positioned outside of the cooling case.

11. The cooling case according to claim 10, wherein each of the battery cells is a pouch type battery cell and has sealing parts and an adhesion part formed by an exterior material, and
   wherein the adhesion part of each battery cell is in direct contact with the cooling member.

12. The cooling case for a battery according to claim 10, wherein the second case and the first case are symmetrical with each other.

13. The cooling case for a battery according to claim 10, wherein the battery cells are spaced apart from the cooling member and are cooled by the cooling member by convection.

14. The cooling case for a battery according to claim 10, wherein the opening is formed on a side of the cooling case between the plurality of coupling parts.

15. The cooling case for a battery according to claim 10, wherein mounting surfaces, on which the battery cells are mounted in the first and second cases, are respectively positioned inside the plurality of coupling parts, and are formed so that the battery cells are exposed to an outside in a section of a protrusion length or less, in which the coupling parts protrude from the bodies.

* * * * *